United States Patent
Goswami et al.

(10) Patent No.: US 9,360,580 B2
(45) Date of Patent: Jun. 7, 2016

(54) METHOD AND APPARATUS FOR DIRECTIONAL WELL LOGGING

(75) Inventors: Jaideva Goswami, Sugar Land, TX (US); Brian Clark, Sugar Land, TX (US); Betty Rong, Missouri City, TX (US); Miguel F. Pabon, Katy, TX (US); Jan S. Morley, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1213 days.

(21) Appl. No.: 13/128,261

(22) PCT Filed: Nov. 23, 2009

(86) PCT No.: PCT/US2009/065463
§ 371 (c)(1),
(2), (4) Date: Aug. 18, 2011

(87) PCT Pub. No.: WO2010/068397
PCT Pub. Date: Jun. 17, 2010

(65) Prior Publication Data
US 2012/0067644 A1    Mar. 22, 2012

Related U.S. Application Data

(60) Provisional application No. 61/121,374, filed on Dec. 10, 2008, provisional application No. 61/245,413, filed on Sep. 24, 2009.

(51) Int. Cl.
*G01V 3/26* (2006.01)
*E21B 47/026* (2006.01)
(Continued)

(52) U.S. Cl.
CPC ............... *G01V 3/26* (2013.01); *E21B 47/026* (2013.01); *E21B 47/02216* (2013.01); *E21B 49/00* (2013.01)

(58) Field of Classification Search
CPC ............ G01V 1/40; G01V 3/00; G01V 3/30; G01V 3/02; G01V 3/04; G01V 3/06; G01V 3/08; G01V 3/081; G01V 3/18; G01V 3/20; G01V 3/22; G01V 3/24; G01V 3/26; G01R 3/0206; G01R 3/0286; G01R 3/0283; G01R 3/028; G01R 3/038; G01R 3/1215; G01R 3/12; G01R 3/0385; G01R 33/02; E21B 47/00; E21B 47/09; E21B 47/0905; E21B 47/122; E21B 47/02216; E21B 47/026; E21B 49/00; G01N 33/24
USPC ......... 324/333, 334, 338, 339, 343, 346, 351, 324/352, 354, 355, 356, 357, 358, 359, 360, 324/363, 366; 174/40–50; 702/6–13
See application file for complete search history.

(56) References Cited

U.S. PATENT DOCUMENTS 3,778,701 A * 12/1973 Runge ............................ 324/366
4,323,848 A *  4/1982 Kuckes .......................... 324/338
(Continued)

FOREIGN PATENT DOCUMENTS

WO    2009151867 A2    12/2009
WO    2010008634 A1     1/2010
(Continued)

OTHER PUBLICATIONS

Omeragic, D. et al, "Deep Directional Electromagnetic Measurements for Optimal Well Placement", presented at 2005 SPE Annual Technical Conference and Exhibition held in Dallas, TX, Oct. 9-12, 2005, pp. 1-12.
(Continued)

*Primary Examiner* — Melissa Koval
*Assistant Examiner* — Felicia Farrow
(74) *Attorney, Agent, or Firm* — Kimberly Ballew

(57) ABSTRACT

A method and apparatus are provided for making directional measurements toward a formation of different resistivity that is proximate to the borehole, but which is not penetrated by the borehole. The methods and apparatus include the use of at least one insulated gap and at least one magnetometer positioned within a non-magnetic housing that is disposed within a non-magnetic tubular. An electric current is applied across the insulated gap, which results in current leaking into the surrounding formations. When a formation of contrasting resistivity is proximate to the logging apparatus, the magnetometer detects a secondary magnetic field due to the contrasting formation. The direction of the secondary magnetic field can be used to determine the direction to the contrasting formation. The magnitude of the secondary magnetic field can be used to determine the distance position to the contrasting formation.

8 Claims, 8 Drawing Sheets

(51) Int. Cl.
*E21B 47/022* (2012.01)
*E21B 49/00* (2006.01)

(56) References Cited

U.S. PATENT DOCUMENTS

| | | | | |
|---|---|---|---|---|
| 4,845,434 | A * | 7/1989 | Kuckes | G01V 3/24 324/247 |
| 5,089,779 | A * | 2/1992 | Rorden | G01V 3/28 324/339 |
| 5,508,616 | A | 4/1996 | Sato et al. | |
| 5,892,362 | A * | 4/1999 | Warren | G01V 3/28 324/339 |
| 6,100,696 | A * | 8/2000 | Sinclair | 324/339 |
| 6,297,639 | B1 | 10/2001 | Clark et al. | |
| 6,393,363 | B1 * | 5/2002 | Wilt | G01V 3/30 324/323 |
| 7,202,670 | B2 | 4/2007 | Omeragic et al. | |
| 7,386,942 | B2 * | 6/2008 | Seigel | 33/313 |
| 7,812,610 | B2 | 10/2010 | Clark et al. | |
| 8,063,641 | B2 | 11/2011 | Clark et al. | |
| 8,289,024 | B2 | 10/2012 | Clark et al. | |
| 8,596,382 | B2 | 12/2013 | Clark et al. | |
| 8,827,005 | B2 | 9/2014 | Morley et al. | |
| 2006/0015257 | A1 * | 1/2006 | Hassan et al. | 702/6 |
| 2006/0028208 | A1 * | 2/2006 | Strack | G01V 3/24 324/355 |
| 2006/0038571 | A1 * | 2/2006 | Ostermeier | G01V 3/38 324/338 |
| 2007/0126426 | A1 * | 6/2007 | Clark et al. | 324/326 |
| 2007/0236222 | A1 * | 10/2007 | Gorek et al. | 324/356 |
| 2007/0257679 | A1 | 11/2007 | Fanini et al. | |
| 2008/0018334 | A1 * | 1/2008 | Reiderman | 324/346 |
| 2008/0041626 | A1 | 2/2008 | Clark | |
| 2011/0298462 | A1 * | 12/2011 | Clark | G01V 3/26 324/346 |

FOREIGN PATENT DOCUMENTS

| | | |
|---|---|---|
| WO | 2010011395 A1 | 1/2010 |
| WO | 2010059263 A1 | 5/2010 |
| WO | 2010065161 A1 | 6/2010 |

OTHER PUBLICATIONS

International Search Report for corresponding International Application No. PCT/US2009/065463 mailed on Jul. 2, 2010, 3 pages.
Written Opinion for corresponding International Application No. PCT/US2009/065463 mailed on Jul. 2, 2010, 6 pages.

* cited by examiner

METHOD AND APPARATUS FOR DIRECTIONAL WELL LOGGING

RELATED APPLICATION

The present disclosure claims the benefit of the filing date of U.S. Provisional Patent Application No. 61/121,374, filed on Dec. 10, 2008, which is hereby incorporated herein by reference in its entirety.

TECHNICAL FIELD

The present disclosure relates to the field of well logging and, more particularly, to an improved method and apparatus for making downhole measurements of formation characteristics. In particular, the method and apparatus are useful in determining the distance from the apparatus in a first formation zone to an adjacent formation zone of different resistivity. The subject of the present disclosure has general application in the well logging art, but is particularly useful in logging-while-drilling.

BACKGROUND

Resistivity logging is a well-known form of electromagnetic ("EM") propagation logging. Resistivity logging is used for measuring and evaluating the characteristics of potential hydrocarbon bearing zones in subsurface formations. Porous formations having high resistivity (low conductivity) generally indicate the presence of hydrocarbons, while porous formations having low resistivity (high conductivity) are generally water saturated. Impermeable shale formations also typically have lower resistivities than hydrocarbon-bearing formations. The ability to differentiate hydrocarbon-bearing formations from water-bearing formations or shale formations is particularly important in drilling horizontal wells where the goal is to maintain the drill bit within a relatively thin hydrocarbon zone.

In conventional wireline logging techniques, a number of antennae or coils are mounted on a well logging tool. The logging tool is lowered into a borehole on the end of a cable, or wireline. An alternating current energizes one or more transmitter coils to emit EM energy into the formations. The emitted energy propagates through the formations surrounding the borehole. The EM energy is measured by one or more receiver coils on the logging tool. The cable, which is attached to a mobile processing center at the surface, is the means by which measured data is sent up to the surface. With this type of wireline logging system, it becomes possible to measure borehole and formation parameters as a function of depth, i.e., while the tool is being pulled uphole.

U.S. Pat. No. 3,778,701, Method of Ultra Long Spaced Electric Logging of a Well Bore to Detect Horizontally Disposed Geologically Anomalous Bodies in the Vicinity of Massive Vertically Disposed Geologically Anomalous Bodies Lateral to and Not Intercepted by the Well Bore, describes a wireline logging technique whereby the presence of electrically resistive formations can be detected when they are not penetrated by the bore hole. An extended length electrode array injects current into the formation and measures the electric potential distribution along the electrode array. The resulting electric potential distribution can be interpreted to detect the nearby presence (or absence) of a zone of high resistivity zone, for example a salt dome. The method does not indicate the direction to the high resistivity zone.

An alternative to wireline logging techniques is the collection of data on downhole conditions during the drilling process. By collecting and processing such information during the drilling process, the driller can modify or correct key steps of the operation to optimize performance. An especially important consideration is whether the drill bit is penetrating the correct geological formation.

Schemes for collecting data of downhole conditions and movement of the drilling assembly during the drilling operation are known as measurement-while-drilling ("MWD") techniques. Similar techniques focusing more on measurement of formation characteristics than on movement of the drilling assembly are known as logging-while-drilling ("LWD"). However, the terms MWD and LWD are often used interchangeably, and the use of either term in the present disclosure should be understood to include both the collection of formation and borehole information, as well as data on movement of the drilling assembly.

An emerging technique in the field of well logging is the use of tools incorporating tilted antennae, i.e., where the coils are tilted with respect to the tool axis. These apparatus are configured as such in an effort to alter the direction of the downhole measurement. U.S. Pat. No. 5,508,616, Apparatus and method for determining parameters of formations surrounding a borehole in a preselected direction, describes a logging tool incorporating tilted transmitter and receiver coils. U.S. Pat. No. 6,297,639 B1, Method and apparatus for directional well logging with a shield having sloped slots, describes an LWD logging technique especially suitable for drilling horizontal wells. U.S. Pat. No. '639 is assigned to the assignee of the present disclosure. The apparatus described in '639 contains antennas for transmitting and receiving EM energy. The receivers determine the relative attenuation and/or the phase shift of the EM energy propagating in the formation. When the apparatus is approximately parallel to a boundary between two formations having differing resistivities, the distance and direction to the boundary can be determined. This technology has proven to be extremely valuable since it allows the driller to maintain the horizontal well in the pay zone. Also see SPE paper 97045-MS, Deep Directional Electromagnetic Measurements for Optimal Well Placement, Q. Li et al, presented at the Society of Petroleum Engineers Annual Technical Conference and Exhibition, 9-12 Oct. 2005, Dallas, Tex.

U.S. Pat. No. 4,323,848 A, Plural sensor magnetometer arrangement for extended lateral range electrical conductivity logging, describes a technique whereby a magnetometer is disposed in a wellbore to detect the distribution and distortion of an electric current flowing in an adjoining strata of interest. The current flow is excited by a distant alternating source located at the surface or at other boreholes, and perturbations in the current flow and accompanying magnetic field caused by the electrical characteristics of the adjoining strata are registered by the magnetometer.

U.S. Patent Application No. 20070126426 A1, Method and Apparatus for Locating Well Casings from an Adjacent Wellbore, is assigned to the assignee of the present disclosure. It describes a technique for locating a casing from a second wellbore.

The apparatus includes an electric current driver having an insulated gap and a magnetometer positioned within a non-magnetic housing that is disposed within a non-magnetic tubular. The electric current enters the formation and a portion of it concentrates on a nearby conductive casing, which results in a secondary magnetic field being generated. The magnetometer is disposed in such a manner that it selectively senses the secondary magnetic field. The distance and direction from the apparatus to the casing is determined from the magnetometer's measurements. This invention has an important application to drilling SAGD (Steam Assisted Gravity Drainage) well pairs in heavy oil formations. The pair of horizontal SAGD wells must be drilled parallel to each other, at a predetermined spacing, typically 5 meters, and with one well placed exactly above the other.

It is desirable to obtain an apparatus and method that can detect the presence of a formation of different resistivity which is not penetrated by the borehole, and to determine the direction and distance to the said formation. Furthermore, such apparatus is not limited to the use of tilted coils, which results in more cost effective and reliable system.

SUMMARY

A method and apparatus are provided for making directional measurements of the resistivities of formations surrounding a borehole. More specifically, this invention provides a means for detecting the presence of a formation of different resistivity that is proximate to the borehole, but which is not penetrated by the borehole. It has particular application to well placement and to drilling horizontal wells, where the goal is to guide the drill bit parallel to a boundary separating two formations of different resistivities. The disclosed methods and apparatus include the use of at least one insulated gap and at least one magnetometer positioned within a non-magnetic housing that is disposed within a non-magnetic tubular. An electric current is applied across the insulated gap, which results in current leaking into the surrounding formations. The magnetometer is configured such that there is no appreciable magnetic signal when there are no formations of contrasting resistivity nearby. The magnetometer is also shielded from the primary magnetic field which arises from current on the apparatus itself. When a formation of contrasting resistivity is proximate to the logging apparatus, the magnetometer detects a secondary magnetic due to the contrasting formation. The direction of the secondary magnetic field can be used to determine the direction to the contrasting formation. The magnitude of the secondary magnetic field can be used to determine the distance position to the contrasting formation.

Other or alternative features will become apparent from the following description, from the drawings, and from the claims.

BRIEF DESCRIPTION OF THE DRAWINGS

Other aspects and advantages of the invention will become apparent upon reading the following detailed description and upon reference to the drawings in which.

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

The following terms have a specialized meaning in this disclosure. While many are consistent with the meanings that would be attributed to them by a person having ordinary skill in the art, the meanings are also specified here.

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

Figure 1:
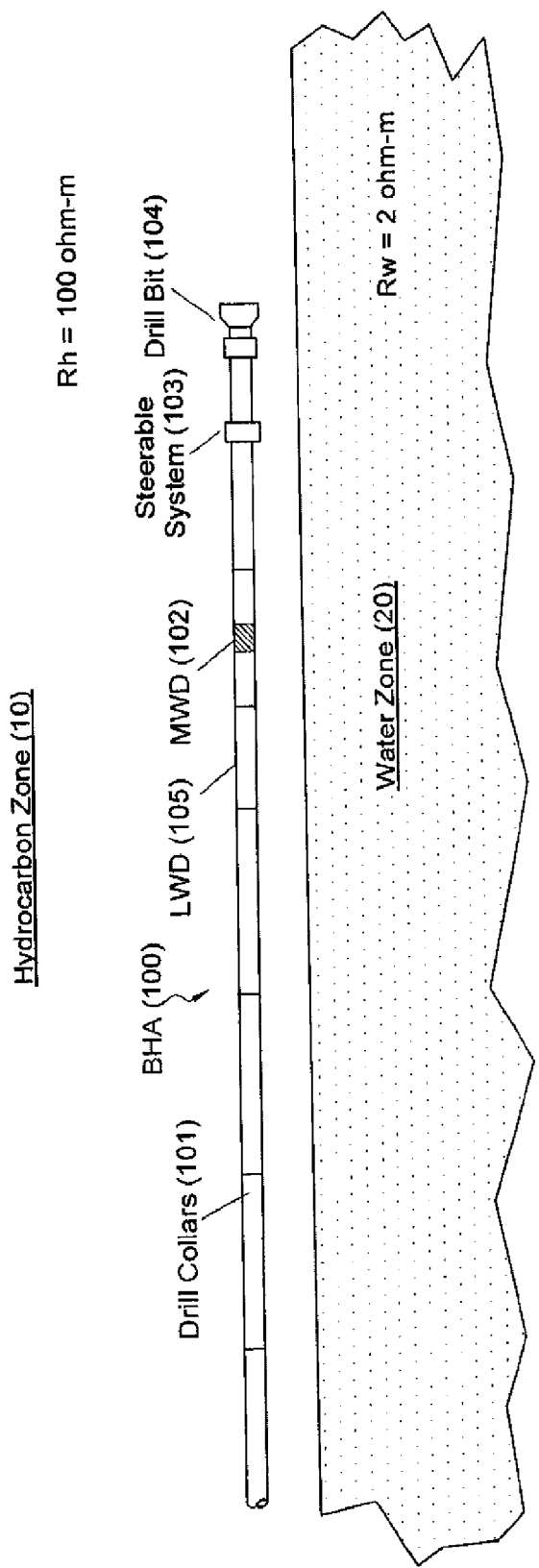
FIG. 1 is a schematic view of a borehole assembly (BHA) containing an insulated gap and a magnetometer, located in a horizontal wellbore in an oil zone, below a shale formation and above a water-bearing formation.

Referring to FIG. 1, a typical situation is illustrated where a horizontal well is being drilled in a hydrocarbon-bearing formation (10) that has a high resistivity. The hydrocarbon zone (10) is bounded on the bottom by a water-bearing formation (20) that has a low resistivity. The goal is to drill the well entirely in the hydrocarbon zone without drilling into the water zone (20). Moreover, the goal may be to maintain the horizontal well a predetermined distance above the water zone (20), for example 2 meters. A typical borehole assembly (BHA 100) is shown consisting of drill collars (101), an MWD tool (102), a steerable system (103), and a drill bit (104). The MWD tool (102) measures the direction and inclination of the BHA and transmits this information to the surface. The MWD data may be sent by mud pulse telemetry, by electromagnetic telemetry, or by any other well known means. Based on the driller's knowledge of the geological formations (i.e. how thick the hydrocarbon zone is, how deep it is, whether the formations are horizontal or dipping, etc.) and based on the MWD measurements, the driller will determine in which direction to steer the drill bit. A steering command is transmitted down to the steerable system (104), which may consist of a motor and bent sub or a rotary steerable system as are well known in the art.

In reality, the hydrocarbon zones' thickness, depth, and dip, and the formation boundaries are typically not known accurately enough for the driller to maintain the drill bit in the hydrocarbon zone (10) using only MWD direction and inclination measurements. Even if the driller had perfect knowledge of the formations' geometries, MWD direction and inclination measurements are not sufficiently accurate to precisely drill a long horizontal well. Even small errors in the MWD direction and inclination measurements accumulate with the distance drilled and can result in large positional errors. For example, a 1° error in the MWD inclination measurement can result in a vertical error of 17 meters after drilling a 1000 meters of horizontal well. Furthermore, MWD direction and inclination measurements are usually only obtained at 30 meter intervals, and since the wellbore direction and inclination may deviate significantly over this distance, even larger errors due to under-sampling can also occur.

For the above reasons, it has become standard practice to use the measurement of formation properties to help steer the drill bit in drilling horizontal wells, which technique is known as "geosteering". For example, the BHA (100) may contain LWD tools (105) to measure the formation properties, such as resistivity, natural radioactivity, or porosity. For example, shale formations and water-bearing formations typically have lower resistivities than hydrocarbon-bearing formations. For the situation illustrated in FIG. 1, the hydrocarbon zone resistivity might be Rh=100 ohm-m, and the water zone resistivity might be Rw=2 ohm-m. The resistivity contrast of the hydrocarbon zone to the water zone is C=Rh/Rw=100/2=50. Thus, measurements of formation resistivity can be used to determine if the drill bit is in the proper formation.

Many LWD devices have been developed to measure formation resistivity, but only after the formation been penetrated by the drill bit. For example, U.S. Pat. No. 5,235,285 describes a resistivity measurement made at the drill bit. Even though this measurement is made at the end of the BHA, it is too late to avoid entering the wrong formation. Preferably, the measurement can be made before the drill bit enters the wrong formation, such that the driller has time to steer the drill bit back into the correct formation. Hence it would be desirable to detect the formation boundaries from a distance of a few meters. In the example of FIG. 1, it would be desirable to detect the approach of the water-bearing formation (20) from several meters away, thus giving the driller time to steer up and away from the formation boundary. Furthermore, most LWD resistivity tools are not sensitive to azimuthal variations—i.e. they measure the average resistivity surrounding the borehole. Without the ability to make azimuthal measurements, it is not possible to determine if the borehole has exited (or will exit) the hydrocarbon-bearing formation through the top, through the bottom, or through a fault on the left or right side. Hence, the ability to determine direction to an approaching formation boundary is also highly desirable.

Figure 2:
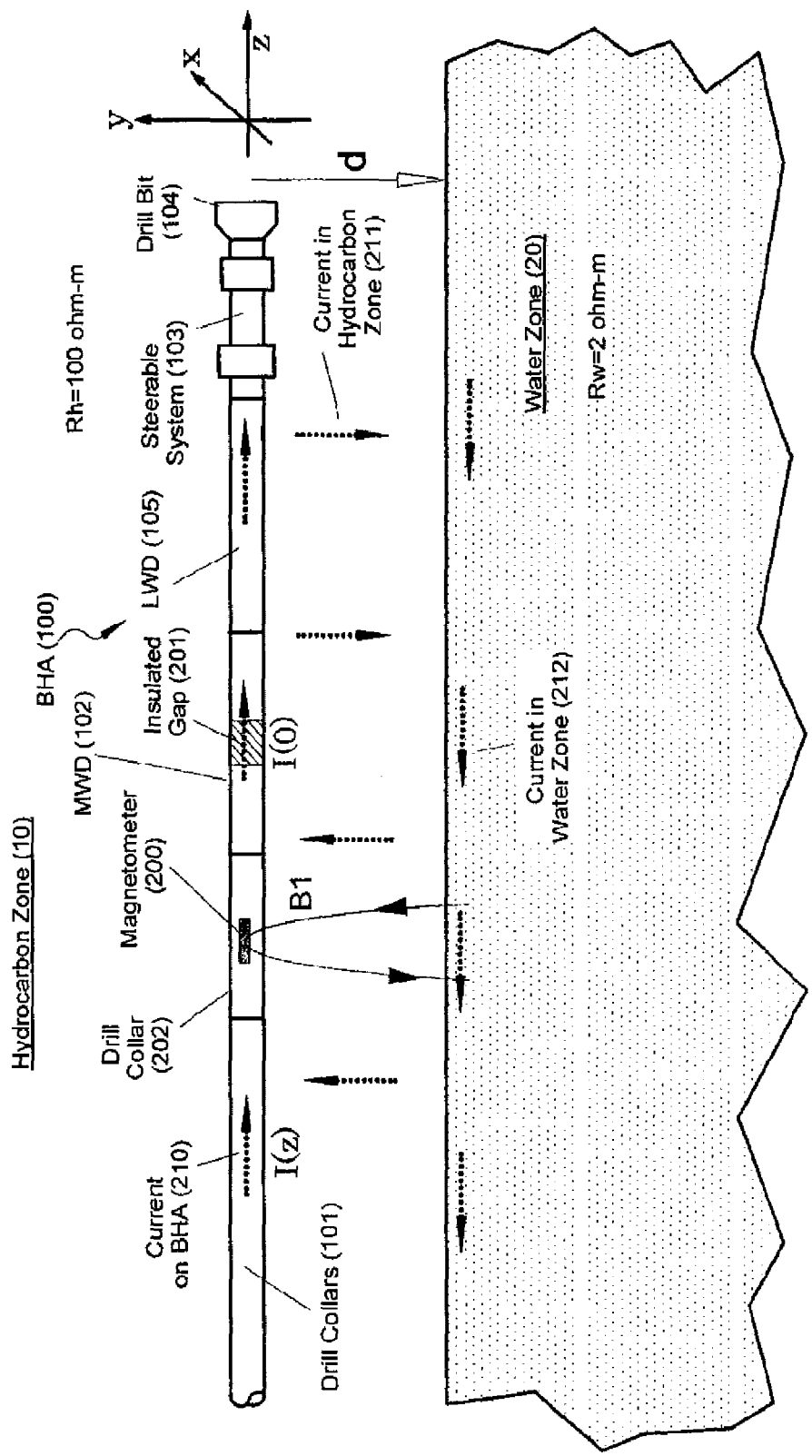
FIG. 2 illustrates a BHA located in a horizontal wellbore in a hydrocarbon-bearing formation above a water-bearing formation.

Referring to FIG. 2, a BHA (100) is illustrated which is able to detect the presence of an adjacent formation with a different resistivity and to determine the distance and direction to the adjacent formation. The BHA includes an MWD tool (102), a steerable system (103), a drill bit (104), an electric current driving tool having an insulated gap (201), and a magnetometer (200) located inside a drill collar. The magnetometer (200) preferably has at least two axes of sensitivity (e.g. x' and y'), with the two axes transverse or perpendicular to the BHA axis (z). Note that the BHA (100) may or may not be rotating, so that the magnetometer axes (x', y') may make an arbitrary angle with respect to the (x, y) axes which are defined as being vertical and horizontal respectively. This angle may also be referred to as the "tool face". A three axis magnetometer having sensitivity in the x', y', and z directions can also be used. If the BHA (100) is rotated through different angles, then it is possible to use a single axis magnetometer mounted in the transverse direction and to make measurements at different angles. It is noted that the BHA may further include LWD tools (105), MWD tools (102), telemetry tools, as well as other downhole tools for use in a drilling environment. It is also noted that a drill collar containing the magnetometer (200) may include other sensors, such as accelerometers.

Electric current driving tool may be, for example, Schlumberger's E-Pulse or E-Pulse Express. For purposes of brevity, current driving tool may be referred to herein as an E-Pulse tool, although other current driving tools may be utilized without departing from the scope of the claimed invention. In the illustrated embodiment, the electric current driving tool may include measurement-while-drilling (MWD) and telemetry (mud pulse or electromagnetic) components. In FIG. 2, the E-Pulse tool both functions as the MWD tool (102) and the source of electric current using an insulated gap (201) drill collar. The insulated gap allows current (210) to be injected onto the BHA (100) for the purposes of EM telemetry and for the purposes of detecting a nearby formation of differing resistivity. Thus it can serve dual purposes in a cost-effective manner. However, it is noted that in some operations, a different configuration may be used. For example, in one example, the current driving tool may be an electromagnetic telemetry tool. In another example, a BHA may include a mud pulse telemetry tool and an electric current driving tool.

Figure 3:
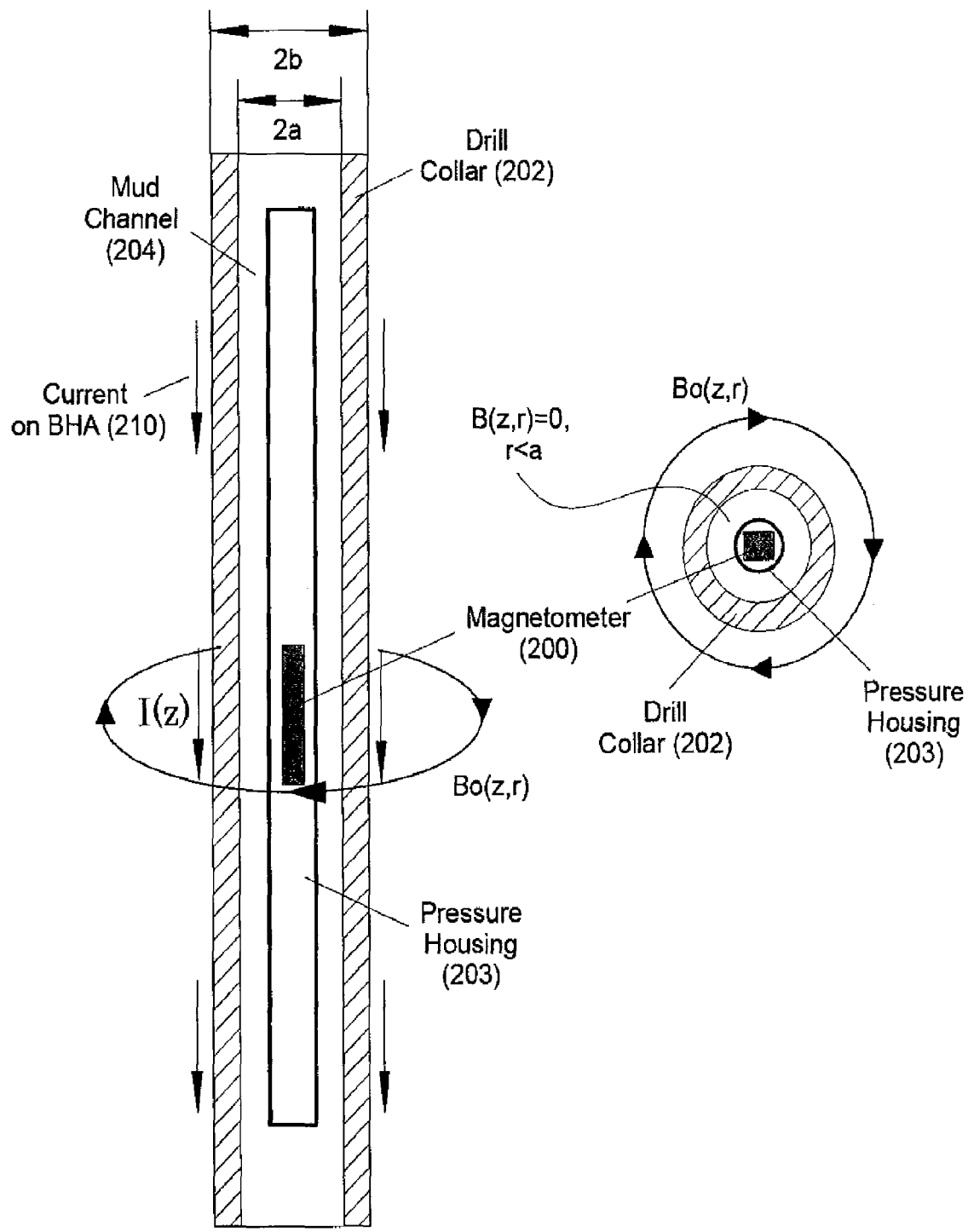
FIG. 3 is a cross-sectional view of a drill collar which contains a pressure housing and a magnetometer.

FIG. 3 is a cross-sectional view of one example of a drill collar (202) containing a magnetometer (200). The drill collar may be constructed of a non-magnetic metal such as stainless steel or beryllium copper; both of which are commonly used as drill collar material. The wall thickness of the drill collar is typically an inch or greater. The drill collar is azimuthally symmetric and has an inner radius r=a and an outer radius r=b. The magnetometer (200) may be carried in a non-magnetic pressure housing (203) centered within the drill collar. A channel (204) is provided between the pressure housing and the interior wall of drill collar (202) for drilling mud.

With reference to FIGS. 2 and 3, the current driving tool generates an alternating electric current I(0) across the insulated gap. For example, the electric current may have a frequency preferably between about 1 Hz and about 100 Hz, and with amplitude up to about 20 amps. Lower frequencies and higher frequencies may also be employed, but the range of 1 Hz to 100 Hz is the most beneficial. The time dependence of the alternating current is governed by the equation: $e^{i\omega t}$, where $\omega$ is the angular frequency and t is time. The time dependence is not explicitly included in subsequent equations and is assumed. Similarly, any magnetic field produced by the current has the same time dependence as the current. The benefit of using an alternating current, as opposed to a direct current (dc), is that the resulting alternating magnetic field can be differentiated from the static Earth's magnetic field, which will generally be much greater than the magnetic field due to the alternating current. Correspondingly, the output of the means for measuring the magnetic field can have a bandpass filter set to the frequency of the alternating current. However, a DC current may also be employed for the measurement, but less conveniently.

An alternating electric current (210) flows along the BHA (100); it enters and flows in the surrounding hydrocarbon formation (211). A portion of the current flows in the water zone (212). In oil-based mud (OBM), most of current will leave the BHA (100) through the drill bit (104) and will return to the BHA (100) above the insulated gap through stabilizers (not shown) and drill collars in contact with the borehole wall. In water-based mud (WBM), the current will flow out of BHA (100) along its length. The current decreases in an approximately linear manner between the insulated gap (201) and the drill bit (104) in WBM.

Let I(z) be the axial current along the BHA (100), where I(0) is the current at the insulated gap (201), and where z is the axial distance from the insulated gap. As illustrated in FIG. 3, for radial distance r>b, the axial current I(z) produces a primary magnetic field given by $\vec{B}_0(z,r)=B_0(z,r)\hat{\theta}$, where r is the radial distance, and $\hat{\theta}$ is the unit vector in the azimuthal direction. At the surface of the drill collar (202), the magnetic field is given by $$\vec{B}_0(z,b) = \frac{\mu_0 I(z)}{2\pi b}\hat{\theta}$$

where $\mu_0=4\pi \cdot 10^{-7}$ Henry/m, I(z) is in amps, and b is in meters.

If the drill collar (202) and pressure housing (203) surrounding the magnetometer (200) are azimuthally symmetric, then the axial current I(z) will also be azimuthally symmetric. This axial current (210) will penetrate into the cross-sectional area of the drill collar, and an azimuthally symmetric current density $\vec{J}(r)=J(r)\hat{z}$ can be defined with units of amps/m$^2$, where $\hat{z}$ is the unit vector in the z-direction. By azimuthal symmetry, it is meant that J(r) is not a function of the azimuth angle θ. If J(r)=0 for r<a, then the magnetic field will also be zero for r<a everywhere inside the drill collar. This follows from Maxwell's equations for electromagnetism and by evaluating the integrals $\oint \vec{B} \cdot \vec{dl} = \mu_0 \iint \vec{J}(r) \cdot \hat{z} dx\, dy$ where the left-hand line integral is evaluated over a circle of radius r<a and the right-hand area integral is evaluated over the cross-sectional area of that circle. This result does not hold true if $\vec{J}(r) \neq 0$ anywhere inside the drill collar, i.e. for r<a. Thus, it is important that none of electric current be allowed inside the drill collar via wires, via electrical feed-through, or via other paths. In practice, it is not possible to have a perfectly symmetric dill collar, but a small degree of asymmetry may be tolerated.

Hence, the magnetometer located inside the drill collar will not detect the primary magnetic field, since $\vec{B}_0(z,r)=0$ for r<a. In a very large homogenous formation, the current in the formation will also be azimuthally symmetric; hence it cannot produce a magnetic field inside the drill collar either. This conclusion follows from applying the same symmetry argument to the current in the formation. Hence, the magnetometer will register a null signal when the BHA (100) is in a large, homogenous formation. The absence of a magnetic field inside the drill collar (null signal) indicates that there is no adjacent formation of different resistivity.

FIG. 2 shows the BHA (100) in a high resistivity oil zone (10) with Rh=100 ohm-m, above a low resistivity water zone (20) with Rw=2 ohm-m. In this situation the current in the hydrocarbon zone (211) will tend to flow toward the water zone (20) since the water zone provides a lower resistivity path back to the BHA (100). Hence, there will be more current in the water zone (20) below the BHA than in the hydrocarbon zone (10) above the BHA. This imbalance in the formation currents will generate an asymmetry magnetic field $\vec{B}$1.

Figure 4:
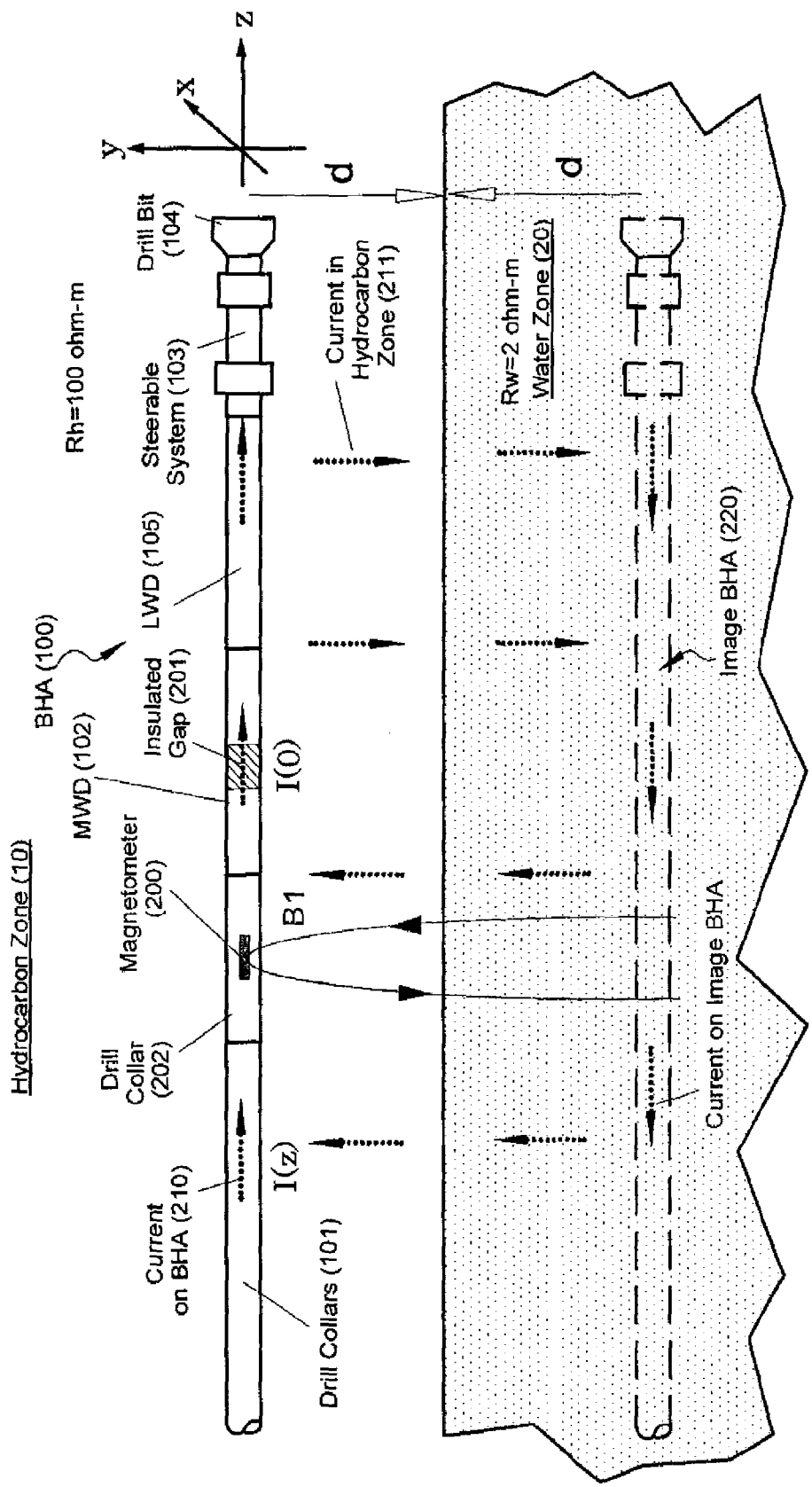
FIG. 4 is a contour plot of the total magnetic field with and without a low resistivity formation below the BHA.
Figure 5:
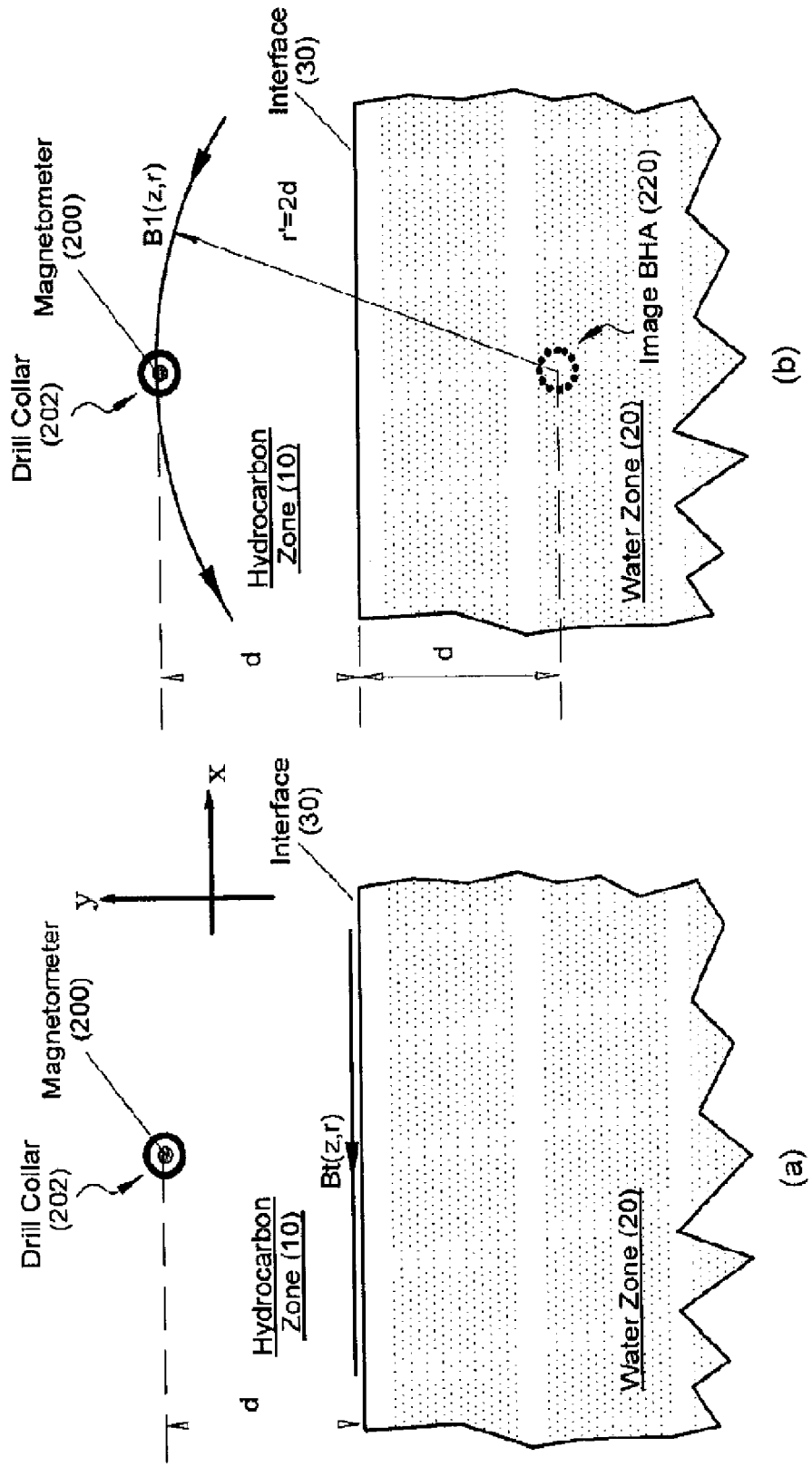
FIG. 5 is a side view of a BHA located in a horizontal wellbore in a hydrocarbon-bearing formation and an image BHA in the water-bearing formation.
Figure 6:
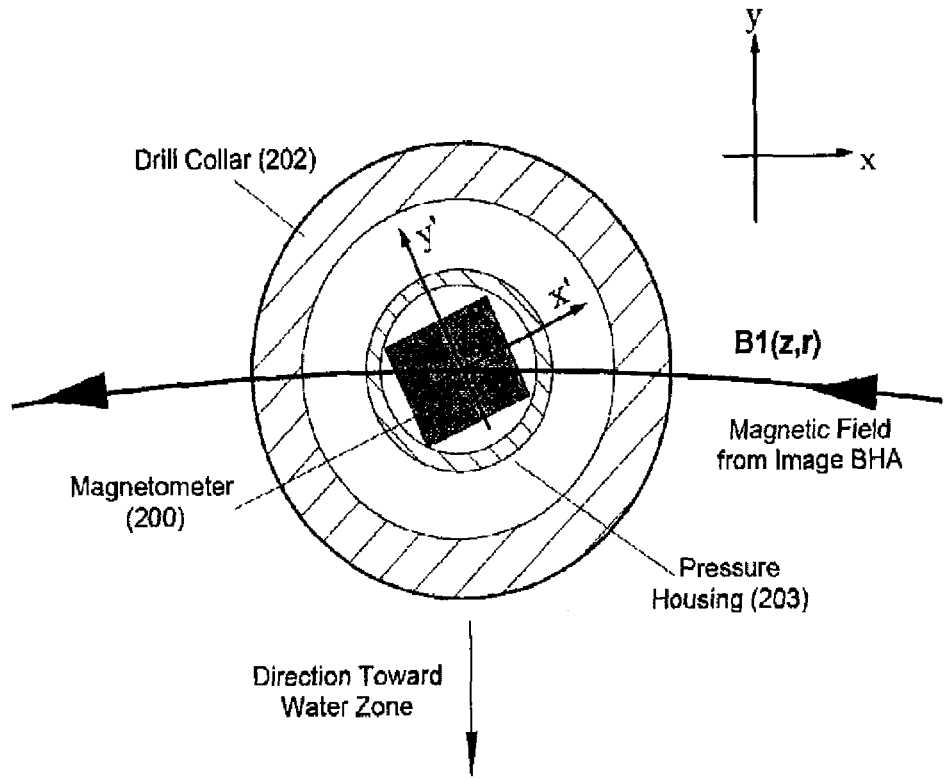
FIG. 6 is an end view of a BHA located in a horizontal wellbore in a hydrocarbon-bearing formation and an image BHA in the water-bearing formation.

The underlying physics can be understood by referring to FIGS. 4 and 5. In the case of a high resistivity contrast, the total magnetic field $\vec{B}t(z,r)$ at the interface (30) between the two zones is essentially parallel to the interface (FIG. 5a). This situation can be modeled approximately by replacing the conductive formation with an image BHA (220) located the same distance (d) below the interface (30) boundary as the actual BHA (100) is above the interface, and by imposing a current on the image BHA (220) which is equal in magnitude but opposite in direction to the current on the actual BHA (100). The vector sum of the two magnetic fields, one from the BHA (100) and one from the image BHA (220), results in the cancellation of the y component of the magnetic field at interface (30). The secondary field $\vec{B}_1(z,r)$ is azimuthally symmetric about the image BHA (220), but it is transverse to the actual BHA (100) at the location of the BHA (FIGS. 4, 5b, and 6). Since the operating frequency is low (<100 Hz), the secondary field $\vec{B}_1(z,r)$ can readily penetrate inside the nonmagnetic drill collar (202) and be measured by the magnetometer (200). If the magnetometer (200) has at least two axes of sensitivity (x' and y'), then the direction to the water zone can be determined since it must be perpendicular to the secondary magnetic field $\vec{B}_1(z,r)$. If the magnetometer (200) has only one transverse axis, then the BHA (100) must be rotated and measurements made at two or more angles or tool faces. Note that the magnetometer (200) is only sensitive to the secondary field, $\vec{B}_1(z,r)$, and does not detect the primary magnetic field, $\vec{B}_0(z,r)$. Hence, a non-zero signal in the magnetometer indicates the presence of an adjacent formation of different resistivity.

The phase of the current on the BHA (100) must also be determined in order to establish whether the low resistivity water zone (20) is above or below the BHA. Since the current on the image BHA (220) is opposite in phase to the current on the actual BHA, it is sufficient to measure the phase of the current at the insulated gap (201). Alternatively, the phase of the current on the BHA (100) may be measured with a small magnetometer mounted on the exterior surface of the BHA (100). Once the current on the image BHA (220) has been determined, application of the "right hand rule" to the current on the image BHA (220) and the magnetic field $\vec{B}_1(z,r)$ resolves the absolute direction (up versus down) toward the low resistivity water zone (20). For example, in FIG. 5b the current on the BHA (100) is into the page, so that the current on the image BHA (220) is out of the page. The secondary magnetic field $\vec{B}_1(z,r)$ is counterclockwise in FIG. 5b according to the right-hand rule. Since the direction of the current on the image BHA (220) is known, and the direction of the secondary magnetic field at the magnetometer is in the −x direction, the low resistivity water zone must be below the BHA (100).

Figure 7:
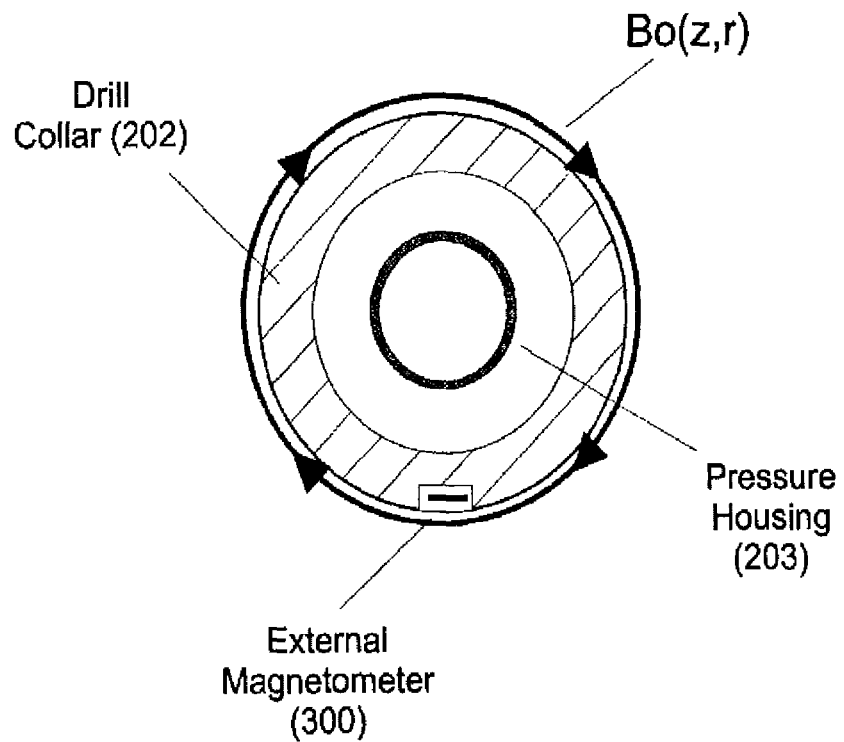
FIG. 7 is a cross-sectional view of a drill collar which contains a pressure housing and a magnetometer and showing a secondary magnetic field.

As the BHA (100) approaches the formation interface (30), the magnetometer signal will increase as the distance d decreases. Hence, the magnetometer (200) can be used to estimate the distance to the formation boundary if the magnitude of the current on the BHA (100) is known. The current on the BHA (100) can be determined by measuring the current applied to the insulated gap (201). Alternatively, the current on the BHA (100) can be measured using a small magnetometer (300) mounted on the surface of the BHA (100) as indicated in FIG. 7. The BHA current (210) is given by $I(z)=(2\pi b/\mu_0)B_0(z,r)$, where r=b.

Figure 8:
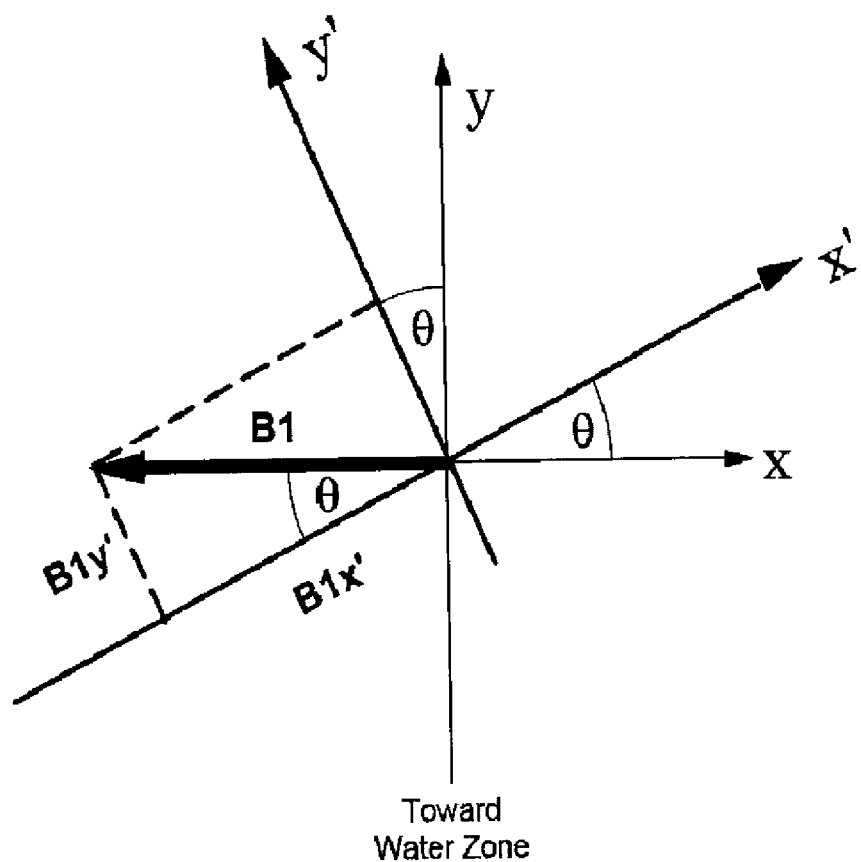
FIG. 8 is a plot of the secondary magnetic field per ampere current versus the distance from the BHA to a low resistivity formation, for various values of the resistivity contrast.

Referring to FIG. 8, the exact direction toward the interface (30) can be determined from the two transverse magnetometer readings. For example, if the formation interface (30) is parallel to the y-z plane, then the direction from the magnetometer (200) toward the interface (30) can be determined from $$\theta = \text{ARCTAN}\left(-\frac{B1y'}{B1x'}\right),$$

where B1x' and B1y' are the signals measured in the x' and y' axes of the magnetometer (200).

A physical explanation has been given for cases of high resistivity contrast, where the BHA is located in the formation of high resistivity and the adjacent formation has low resistivity. If the resistivity contrast is small, then the secondary magnetic field must be weaker. This follows since the secondary magnetic field must be zero if there is no contrast, i.e. C=1. Numerical simulation verifies that the magnitude of $\vec{B}_1(z,r)$ decreases as the resistivity contrast decreases. The secondary magnetic field also decreases with the distance (d) from the BHA to the formation boundary. The secondary magnetic field at the location of the magnetometer can be approximated with the following equation $$B1(d) = \left\{\alpha\left(\frac{C-1}{C+1}\right)e^{-\beta d} + \gamma\right\}I(0),$$

where α and β are constants that depend on the known BHA geometry. For example, let there be 12.2 meters of BHA below the insulated gap (201), let the magnetometer (200) be located 6.25 meters above the insulated gap, and let the insulated gap be 0.7 meters long. For this particular geometry, α=10.81 nTesla/amp, β=0.24 m$^{-1}$, and γ=0.54 nTesla/amp. This expression is accurate over the range of d=0.5-10 meters. The secondary magnetic field is plotted in FIG. 9 for contrasts: C=2, 3, 5, 10, and 100. The magnetic field per ampere decreases exponentially with distance d, and also decreases with decreasing values of C.

The distance d to the formation interface (30), may be obtained from $$d = -\frac{1}{\beta}\ln\left\{\frac{\vec{B}_1 - \gamma}{\alpha I(0)}\left(\frac{C+1}{C-1}\right)\right\},$$

where $\vec{B}_1$ is the measured value of the secondary magnetic field.

To infer the distance d, the contrast C must be estimated. Generally the contrast may be obtained from nearby wells that penetrate both zones (10) and (30). If the contrast is high, i.e. C≥10, then a precise knowledge of C is not necessary since the functional dependence on the contrast C is minimal. For reasonably constant formation properties, an increase in $\vec{B}_1$ may be interpreted as the distance to the formation boundary decreasing, and a decrease in $\vec{B}_1$ may be interpreted as the distance to the formation boundary increasing. Thus the driller may take appropriate actions to maintain the drill bit the proper distance from the formation boundary.

Figure 9:
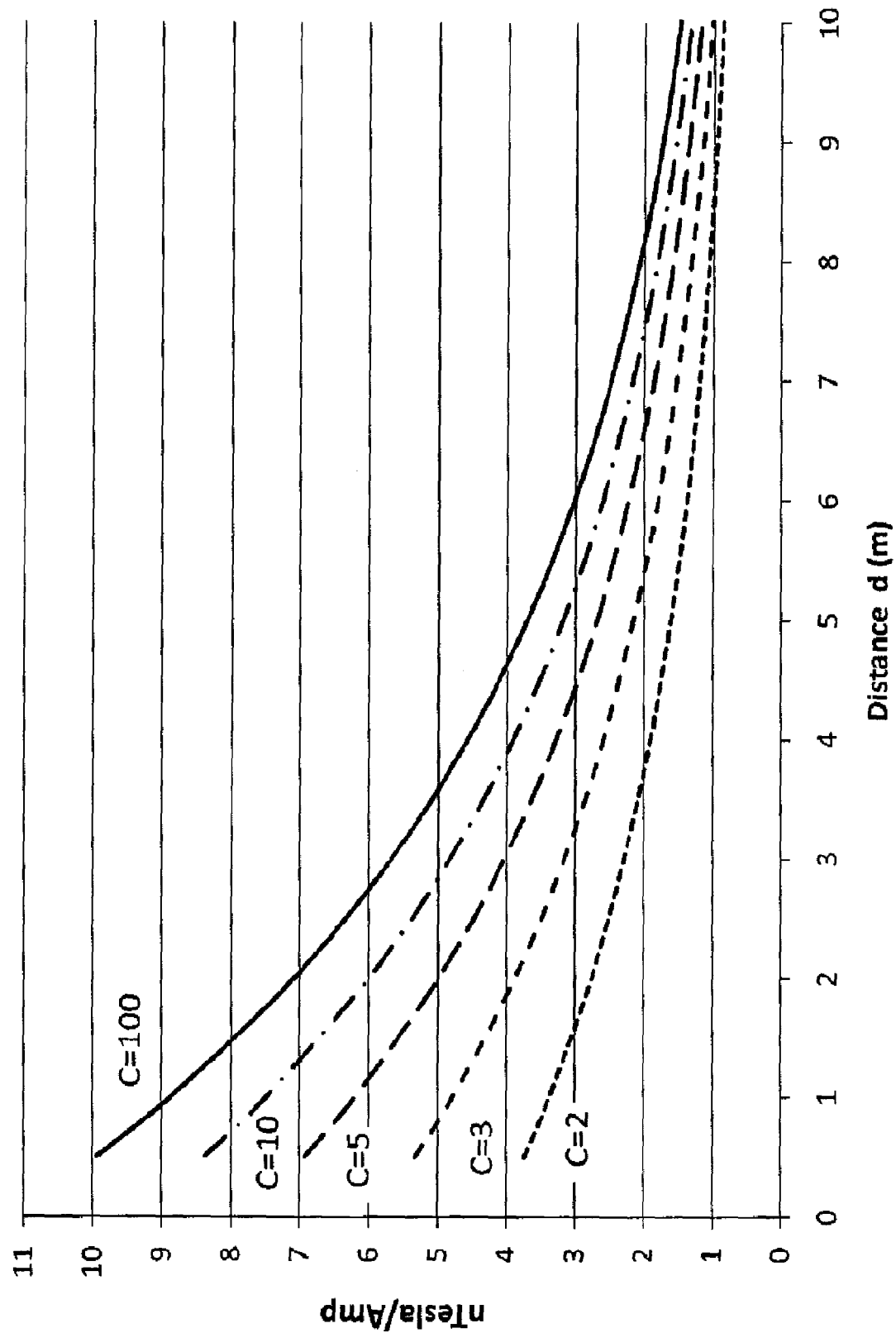
FIG. 9 is a plot of sensitivity versus distance.

For the example shown in FIG. 9, the magnetometer is sensitive to formation boundaries up to about 10 meters away. For different BHA configurations, the sensitivity may be greater or lesser depending on the distance from the insulated gap to the drill bit and on the position of the magnetometer in the BHA. By varying these distances, the BHA can be optimized for the particular wellbore position and for the anticipated formation resistivities.

In the above discussion, the BHA is located in a formation of low resistivity and the adjacent formation has a high resistivity. Similarly, the method can be applied to the situation where the BHA is located in a formation of low resistivity and the adjacent formation is one of high resistivity. A similar principle applies and the method can be used to determine the presence of an adjacent formation of high resistivity, the direction and distance to the adjacent formation.

One implementation of this invention can be in an electromagnetic (EM) MWD tool, such as E-Pulse. The EM MWD tool has an insulated gap and current generating means for the primary purpose of transmitting data to the surface and receiving commands from the surface. The MWD tool also contains an inclinometer and a magnetometer for determining the inclination and compass direction of the BHA, which data are regularly transmitted to the surface. Applying the inventions disclosed here, said E-Pulse tool can also be used to detect the presence of an adjacent formation, and to determine the direction and distance to the adjacent formation. This is especially advantageous for drilling horizontal wells in hydrocarbon formations bounded by low resistivity formations. Because the EM MWD tool may already contain the necessary hardware to perform these functions, it can provide a cost-effective service in low cost wells. Examples of such low cost wells include coal bed methane wells, shale gas wells, tight formation gas wells, steam assisted gravity drainage (SAGD) wells.

The invention is not limited to the specific implementations described. The insulated gap and magnetometer may be located inside any conductive tubular, such as a drill collar, a section of coiled tubing, a wireline tool, etc. Thus this technique may also be applied to casing drilling, coiled tubing drilling, wireline logging. In addition, the example of a water zone below the hydrocarbon zone was given, but the method can equally well be applied to locating a shale bed above the hydrocarbon zone. Furthermore, the invention is not restricted to use in hydrocarbon zones, but is applicable to any situation where there exists a contrast in resistivity between two earth layers.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of electromagnetic resistivity measurement to determine distance and direction to a boundary within a formation, comprising:
    deploying a conductive tubular in a wellbore in a first formation having a first resistivity, the conductive tubular having a drill bit that axially extends the wellbore, a gap, and a magnetometer configured to receive a magnetic signal from an adjacent formation having a contrasting resistivity;
    while axially extending the wellbore in the first formation, generating a current along the conductive tubular and across the gap wherein the current induces a primary magnetic field arising from the current in the tubular, the current leaking into the first formation and induces a secondary magnetic field;
    measuring a direction of the secondary magnetic field;
    determining a direction of the adjacent formation from the direction of the secondary magnetic field;
    measuring a magnitude of the secondary magnetic field; and
    determining a distance to the adjacent formation wherein the wellbore does not pass based on a non-zero magnitude of the measured secondary magnetic field and is steered away from the adjacent formation.

2. The method according to claim 1, further comprising steering additional axial extension of the wellbore with the drill bit based on the distance to the adjacent formation.

3. The method according to claim 1, wherein the conductive tubular comprises one of a drill collar, a bottomhole assembly, a wireline sonde, and a coiled tubing conveyance apparatus.

4. The method according to claim 1, further comprising measuring a phase of the current generated on the conductive tubular.

5. The method according to claim 4, further comprising determining whether the formation boundary is uphole or downhole based on the phase of the current on the conductive tubular.

6. The method according to claim 1, further comprising measuring the amplitude of the generated current on the conductive tubular.

7. The method according to claim 6, further comprising inputting an estimate for a resistivity contrast C and performing an inversion computation to solve for the distance according to an equation of the form:

$$d = \frac{1}{\beta} \ln\left\{ \frac{\alpha}{\vec{B}_1} \left( \frac{C-1}{C+1} \right) \right\}.$$

where d is the distance from a BHA to the adjacent formation, $\alpha$ and $\beta$ are constants that depend on BHA geometry and $\vec{B}_1$ is a measured value of the secondary magnetic field.

8. A drilling system, comprising:
 a conductive tubular in a wellbore in a first formation having a first resistivity, the conductive tubular comprising:
  a drill bit that axially extends the wellbore,
  an electric current driving tool having an gap that generates a current along the conductive tubular and across the gap, wherein the current generates a primary magnetic field and leaks into the first formation generating a secondary magnetic field, and
  a magnetometer configured to receive magnetic signal of an adjacent formation of contrasting resistivity, wherein the magnetometer is shielded from the primary magnetic field and measures a direction and a magnitude of the secondary magnetic field to determine a direction and a distance from the adjacent formation;
 the drilling system further comprising:
  a MWD tool transmits the measurements to the surface;
  a surface control computer system that determines the presence of the adjacent formation through which the wellbore does not pass based on a non-zero magnitude of the measured secondary magnetic field; and
  a steerable system that receives a driller command based on the determined presence of the adjacent formation through which the wellbore does not pass and steers the drill bit in a given trajectory in the formation based on the driller command.

* * * * *